United States Patent
Cresgy et al.

[19]

[11] Patent Number: 6,085,429
[45] Date of Patent: Jul. 11, 2000

[54] OPTICAL DISC SPINDLE STRAIGHTNESS TESTING APPARATUS AND METHOD

[75] Inventors: Joseph Dale Cresgy, Terre Haute; Edward Lee Proffitt, Brazil, both of Ind.

[73] Assignees: Sony Corporation, Tokyo, Japan; Digital Audio Disc Corporation, Terra Haute, Ind.

[21] Appl. No.: 09/175,736

[22] Filed: Oct. 20, 1998

[51] Int. Cl.[7] .................................................. G01B 7/28
[52] U.S. Cl. ................................................ 33/533; 33/550
[58] Field of Search ................................ 33/501.02, 533, 33/545, 546, 547, 549, 550, 551, 552, 553, 554, 555

[56] References Cited

U.S. PATENT DOCUMENTS

| | | | |
|---|---|---|---|
| 3,795,055 | 3/1974 | Zucco ........................................... | 33/550 |
| 4,696,190 | 9/1987 | Bucher et al. .............................. | 33/533 |
| 4,750,141 | 6/1988 | Judell et al. ................................ | 33/550 |
| 4,914,827 | 4/1990 | Cook ........................................... | 33/549 |
| 5,116,234 | 5/1992 | Bertz et al. ................................. | 33/552 |
| 5,301,436 | 4/1994 | Johnston ..................................... | 33/551 |
| 5,485,406 | 1/1996 | Wada et al. ................................. | 33/551 |

FOREIGN PATENT DOCUMENTS 2000005  7/1971  Germany ................................... 33/550

OTHER PUBLICATIONS

*Declaration of Joseph D. Cresgy*, (Feb. 16, 1999).

*Primary Examiner*—G. Bradley Bennett
*Attorney, Agent, or Firm*—Wood, Herron & Evans, L.L.P.

[57] ABSTRACT

A test apparatus and method utilize a proximity sensor to detect the deflection of an optical disc spindle as the spindle is supported on a rotatable spindle support. The proximity sensor is disposed at a fixed location relative to the rotational axis of the rotatable spindle support, and is configured to output a variable proximity signal associated with the distance between the proximity sensor and the optical disc spindle. The output of the proximity sensor is fed to an electrical circuit to determine whether the deflection is outside of an acceptable range during rotation of the rotatable spindle support. If so, an indication is provided to an operator to permit the operator to repair or discard the spindle, as appropriate. In addition, a length detector is used to provide an indication of the length of the optical disc spindle so that the electrical circuit can adjust the acceptable deflection range for different lengths of optical disc spindles.

23 Claims, 4 Drawing Sheets

OPTICAL DISC SPINDLE STRAIGHTNESS TESTING APPARATUS AND METHOD

FIELD OF THE INVENTION

The invention is generally related to testing the straightness of optical disc spindles used in the production of optical discs and the like.

BACKGROUND OF THE INVENTION

Optical discs such as compact discs (CD's), digital video discs (DVD's), laser discs and the like are widely used in the computer and consumer electronics industries as a relatively inexpensive and reliable medium for storing audio, video and/or other digital information. Optical discs may be produced from relatively inexpensive media and are readily suited for mass production.

A wide variety of manufacturing processes performed during the production of optical discs are tailored for processing tens or hundreds of optical discs at a time. To simplify the performance of these processes on automated equipment, as well as to facilitate the transfer of optical discs between various processes, the optical discs are often stacked together on a "spindle" having a shaft that extends through the central aperture in each optical disc. A number of manufacturing processes rely on optical disc spindles, including but not limited to molding, reflecting, protecting, printing, and packaging, among others.

One difficulty associated with the use of such optical disc spindles is that a spindle from time to time may become "bent", where the shaft is no longer perpendicular to the base of the spindle. It has been found that if a spindle is bent beyond a certain amount, problems can arise with the automated equipment with which the spindle is used, often resulting in defective discs and/or equipment failures. Often, this amount is relatively small (e.g., less than a 1 mm deflection at the free end of the shaft), so visual detection by an operator is usually not feasible. Often, a bent spindle is not detected until equipment fails or defective discs are produced. In either event, manufacturing costs often increase and productivity often decreases.

Manual methods of testing the straightness of an optical disc often require a technician to manually take multiple measurements at various points on a spindle. Such manual methods are often time consuming and unreliable due to measurement errors.

Therefore, a substantial need has arisen for a manner of quickly and reliably detecting the straightness of optical disc spindles used in the production of optical discs and the like.

SUMMARY OF THE INVENTION

The invention addresses these and other problems associated with the prior art by providing a test apparatus and method that utilize a proximity sensor to detect the deflection of an optical disc spindle as the spindle is supported on a rotatable spindle support. The output of the proximity sensor is fed to an electrical circuit to determine whether the deflection is outside of an acceptable range during rotation of the rotatable spindle support. If so, an indication is provided to an operator to permit the operator to repair or discard the spindle, as appropriate.

In certain embodiments of the invention, a proximity sensor is disposed at a fixed location relative to the rotational axis of the rotatable spindle support, and is configured to output a variable (e.g., analog) proximity signal associated with the distance between the proximity sensor and the optical disc spindle. Moreover, in certain embodiments, a length detector is also provided to provide an indication of the length of the optical disc spindle so that the electrical circuit can adjust the acceptable deflection range for different lengths of optical disc spindles, thereby permitting multiple lengths of optical disc spindles to be tested, often with little or no mechanical modifications or adjustments to the test apparatus by the operator. As such, optical disc spindles may be tested in a fast and reliable manner.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
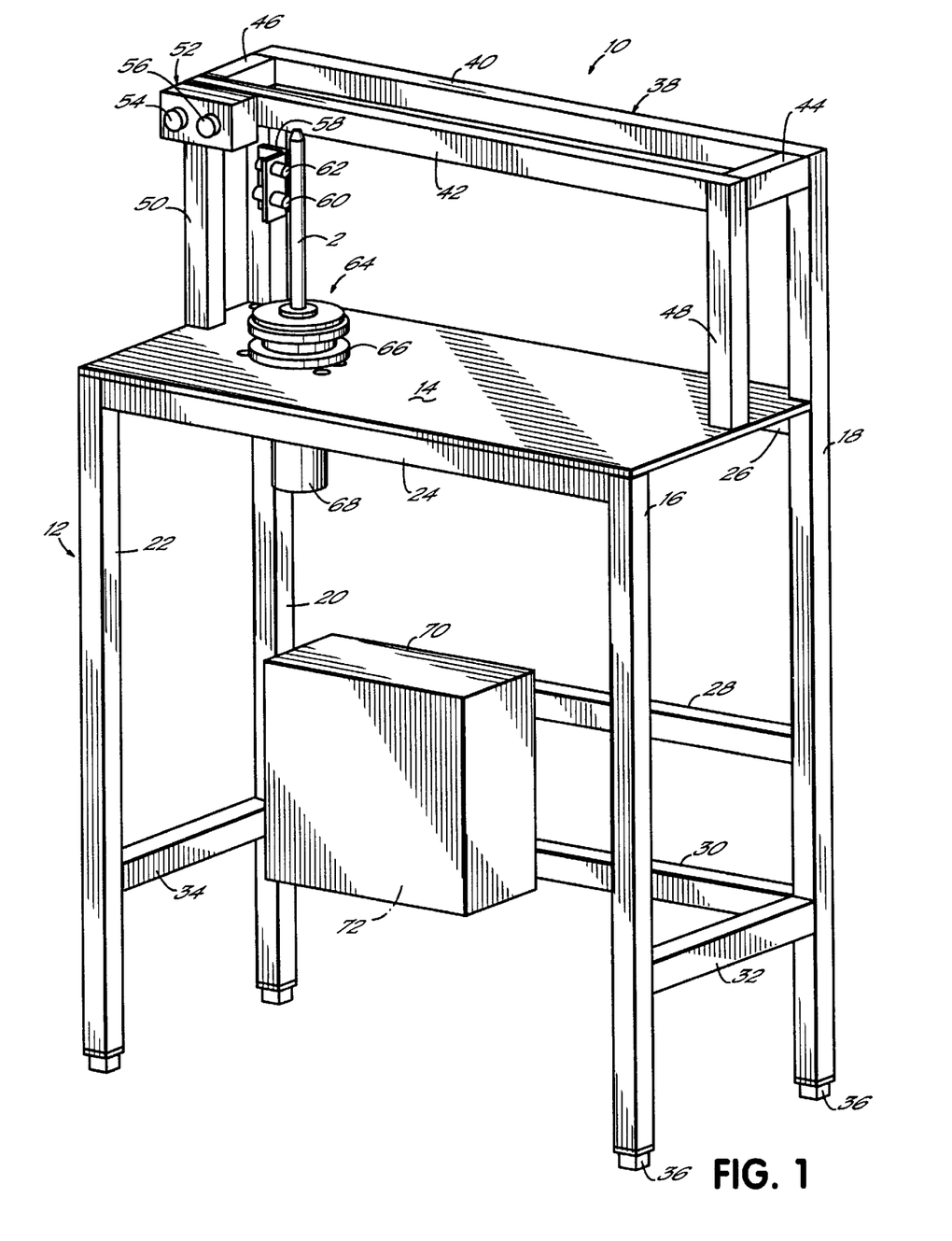
FIG. 1 is a perspective view of a test apparatus consistent with the invention.

Turning to the Drawings, wherein like numbers denote like parts throughout the several views, FIG. 1 illustrates a test apparatus consistent with the principles of the invention. Test apparatus 10 includes a base or frame 12 supporting a work surface 14 upon which optical disc spindles, e.g., optical disc spindle 2, are tested.

Work surface 14 typically provides an additional surface area to permit an operator to straighten or otherwise repair any defective optical disc spindles.

The work surface is supported via four legs 16, 18, 20 and 22. Legs 16 and 22 are secured to work surface 14 at opposite ends of a work surface support member 24, while legs 18 and 20 are similarly disposed at opposite ends of a work surface support member 26. Additional reinforcement between legs 18, 20 is provided by a pair of transverse members 28, 30, and reinforcement between legs 16 and 18, and between legs 20 and 22 is respectively provided by transverse support members 32, 34. Furthermore, a leveling foot 36 is disposed at the end of each of legs 16, 18, 20 and 22. A sensor/indicator support 38 is provided on base 12 above work surface 14. Support 38 includes a transverse member 40 extending between the top ends of legs 18, 20, with a parallel support 42 secured thereto via transverse members 44, 46. A pair of vertical members 48, 50 extend from work surface 14 to support members 42, 44 and 46.

In the illustrated embodiment, the various support members on base 12 are 40 mm×40 mm aluminum extrusions fastened together via conventional fasteners. It should be appreciated, however, that a wide variety of other materials and constructions may be utilized to support work surface 14. For example, a table-top configuration may also be used in the alternative.

An indicator housing 52 is secured to support member 42, and has disposed therein a pass indicator 54 and a fail indicator 56. Indicators 54, 56 may be, for example, incandescent lamps, or any other form of visual indicator such as LED's, alphanumeric displays, etc. Moreover, other manners of indicating a pass or fail condition to an operator may be used, including various audio and/or visual mechanisms. In the illustrated embodiment, the pass indicator 54 is green in color, and indicator 56 is red in color.

Also supported on support member 42 is a sensor bracket 58 supporting a proximity sensor 60 and a length detector 62. Proximity sensor 60 is positioned to detect the straightness of an optical disc spindle in a manner detailed below. Moreover, length detector 62 is positioned to distinguish between two lengths of spindles to adjust the acceptable range of deflection detected by the proximity sensor.

A rotatable spindle support 64 is supported on work surface 14, including a turntable assembly 66 driven by an electric motor 68. Sensor 60 and detector 62 are positioned to sense the presence of various optical disc spindles 2 disposed on turntable assembly 66, as will become more apparent below.

Also shown in FIG. 1 is a housing 70 within which is disposed a controller 72 for operating the test apparatus in a manner consistent with the invention.

Figure 2:
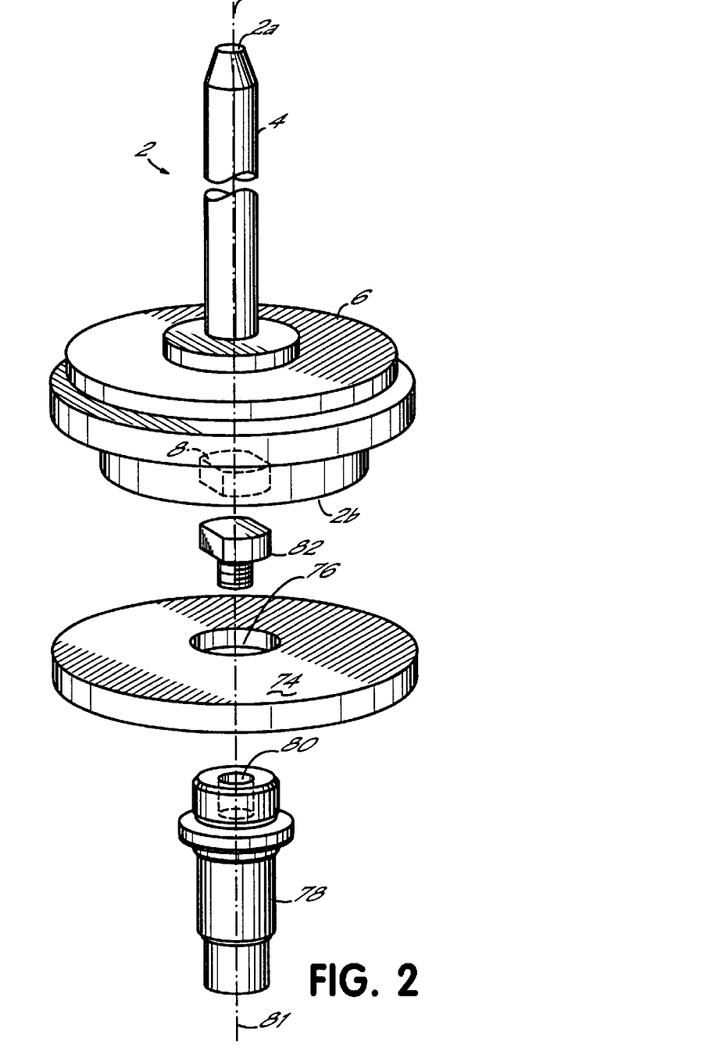
FIG. 2 is an exploded perspective view of the turntable assembly for the test apparatus of FIG. 1, showing the interface of the assembly with an optical disc spindle.

FIG. 2 illustrates in greater detail turntable assembly 66, which includes a disc 74 having a central bore 76 configured to receive a turntable shaft 78 in a threaded arrangement. A threaded aperture 80 disposed in a top surface of turntable shaft 78 is further configured to receive a threaded alignment pin 82 that extends above the surface of disc 74. Alignment pin 82 is configured and arranged to center and support an optical disc spindle, e.g. optical disc spindle 2 of FIG. 2. As shown in this figure, an optical disc spindle typically includes first and second ends 2a, 2b, with a shaft 4 supported on a base 6 and defining a longitudinal axis 2c for the spindle. Along the underside of base 6 is disposed an aperture 8 which is configured and arranged to cooperatively mate with alignment pin 82 such that the spindle is firmly supported on turntable assembly 66. It should be appreciated that alignment pin 82 and aperture 8 may have cooperating surfaces to prevent the relative rotation between the spindle and the turntable about rotational axis 81.

It should be appreciated further that aperture 8 is configured to support the spindle in various manufacturing processes. However, should a spindle be provided with an alternate mechanism for securing the spindle in various automated equipment, the configuration of turntable assembly 66 may differ to adequately support the spindle for testing purposes.

Figure 3:
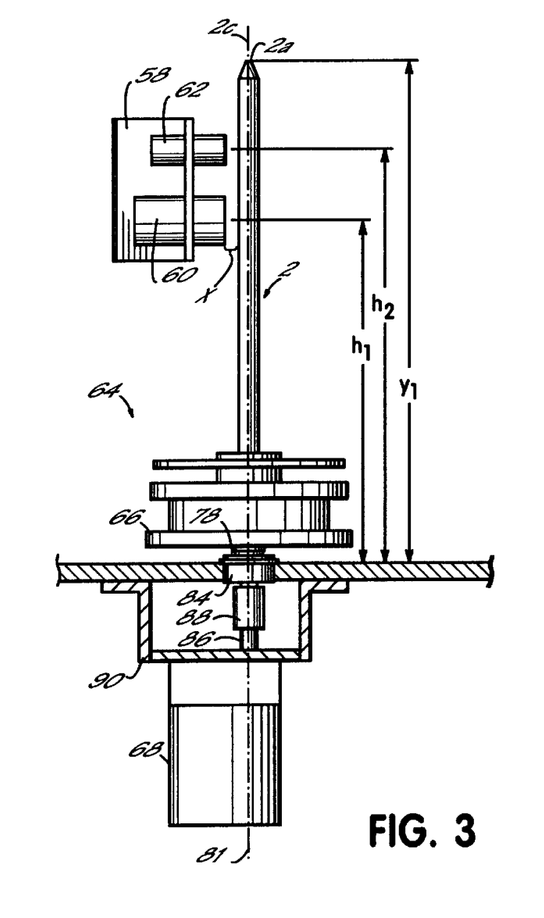
FIG. 3 is a functional elevational view of the primary operational components of the test apparatus of FIG. 1, showing the testing of a tall optical disc spindle thereby.

As shown in FIG. 3, turntable assembly 66 of optical spindle support 64 is rotatably secured to work surface 14 via a bearing 84. In the illustrated embodiment, bearing 84 is press-fit into a suitable aperture in work surface 14, and the turntable shaft of turntable assembly 66 is press-fit into the central aperture of the bearing. Turntable shaft 78 is in turn secured to a drive shaft 86 of motor 68 via a coupling 88. Moreover, motor 68 is secured to the underside of work surface 14 via a suitable bracket 90.

Given that the amount of acceptable deflection in a spindle is typically less than 1 mm at the first end 2a thereof, it is important that the optical spindle support 64 maintain the longitudinal axis 2c of a spindle precisely in a collinear relationship with the rotational axis 81 of support 84. To this extent, it is desirable to machine the various components in test apparatus 10 to a relatively tight tolerance, e.g., a maximum run out tolerance of 0.01 mm. Bearing 84 in the illustrated embodiment is a double row angular bearing, e.g., MRC5201-SBKFFG bearing available from TRW Bearings of Jamestown, N.Y., to minimize the rotational and angular deviation of the turntable. Coupling 88 in the illustrated embodiment is a disc coupling, e.g., the 60635K824 ⅜ inch disc coupling available from McMaster Carr. The disc coupling is used to compensate for any misalignment between the turntable shaft 78 and drive shaft 86. Further, the disc coupling operates to transmit torque and velocity at a constant rate without backlash.

Motor 68 in the illustrated embodiment is a single phase induction motor with a 30:1 gear head that turns at 60 RPM's, or one revolution per second, e.g., the 31K15GN-AUL/3GN60KA induction motor available from Oriental Motor of Torrance, Calif. The motor is operated counter-clockwise to prevent the alignment pin from unthreading from the turntable shaft. Other forms of motors, whether electric, hydraulic, etc. may also be used in the alternative. Moreover, in other embodiments, a motor may not be necessary, whereby a user would manually rotate the turntable to achieve the same result.

It should be appreciated that alternate mechanical components may be utilized in optical spindle support 64 in the alternative.

As also shown in FIG. 3, optical sensor 60 is axially displaced from work surface 14 at a predetermined axial distance labeled h, (here about 21.29 cm, or about 8.38 inches). Moreover, the radial separation between sensor 60 and rotational axis 81 is selected to provide a nominal distance x between sensor 60 and shaft 4 of optical spindle 2. In the illustrated embodiment, proximity sensor 60 is a linear analog inductive proximity sensor, e.g., the IWRM 3019502 linear sensor available from Baumer Electric. With this sensor, an operating distance range of 5 to 9 mm is provided, and as such, it is desirable to position sensor 60 to provide a reading within the center of this range, e.g., about 7 mm from the expected position of the shaft relative to the horizontally-aligned sensor 60. To ensure accurate measurements, it is important that the sensor be mounted securely to the frame.

Figure 4:
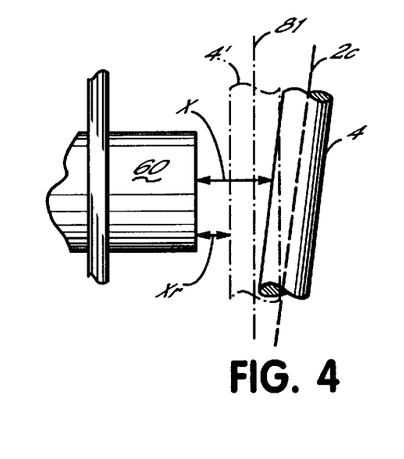
FIG. 4 is an enlarged fragmentary elevational view illustrating the orientation of the proximity sensor in the test apparatus of FIG. 1.

As best shown in FIG. 4, sensor 60 is positioned to detect the offset of the longitudinal axis 2c of a spindle shaft 4 relative to rotational axis 81 along a radial line extending perpendicular to rotational axis 81. The actual deflection of shaft 4, represented at x, is shown relative to the expected, or reference distance x, distance between proximity sensor 60 and an expected position of the shaft, represented at 4'.

It should be appreciated that other sensors capable of outputting a variable proximity signal at various distances may be used in the alternative, e.g., ultrasonic sensors, etc.

Figure 5:
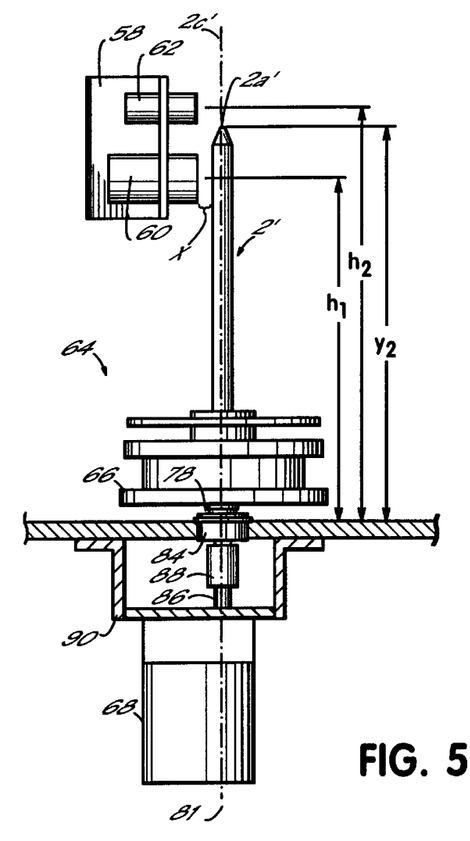
FIG. 5 is a functional elevational view of the primary operational components of the test apparatus of FIG. 1, showing the testing of a short optical disc spindle thereby.

Returning to FIG. 3, length detector 62 is disposed at a second axial separation, designated $h_2$ on work surface 14 (here, about 25.7 cm, or about 10.12 inches). The axial separation, or height, of the detector is selected to discriminate among spindles of two different types. The first type of spindle is designated a tall spindle, which is typically capable of holding about 170 optical discs, and having a shaft extending about 27.3 cm (about 10.75 inches) from the base. For this type of spindle, the first end $2a$ thereof, when the spindle is disposed on turntable assembly 66, is separated a distance $y_1$ from work surface 14 (here, about 32.2 cm, or about 12.68 inches). This distance is greater than $h_2$, such that detector 62 detects the presence of shaft 4 of optical spindle 2 and outputs a signal indicative thereof. As shown in FIG. 5, a second type of spindle, a short spindle 2', is illustrated disposed on turntable assembly 66. A short spindle is typically capable of holding about 100 optical discs, and having a shaft extending about 21.0 cm (about 8.25 inches) from the base. For the short spindle 2', the first end $2a'$ thereof is disposed at a second distance $Y_2$ from work surface 14 (here, about 24.1 cm, or about 9.50 inches). For this spindle, the distance $Y_2$ is less than the height of length detector 62 ($h_2$) such that when the spindle is disposed on the turntable assembly, the presence thereof is not detected by detector 62. However, sensor 60 is still positioned in such a manner to detect the presence of and additions to spindle 2'.

In the illustrated embodiment, length detector 62 is an inductive-type sensor, e.g., an IFRM18P1702/L inductive sensor available from Baumer Electric. Detector 62 therefore outputs a length signal that discriminates between spindles having a height from the work surface, when disposed on the turntable assembly, that is greater than the height of the detector, from other spindles that once supported on the turntable assembly do not extend to the height of the detector.

It should be appreciated that other detectors for discriminating between different lengths of spindles may be used in the alternative. Moreover, rather than discriminating between two sizes of spindles, it should be appreciated that other sensors may be used to determine the actual length of a spindle among a wider range of possible lengths.

Length detector 62 is typically used to adjust the acceptable range of distance variations detected by sensor 60 such that the determination of whether a spindle is defective can be customized for different lengths of spindles, and without any mechanical modifications to the test apparatus. Nominally, it is desirable to set the acceptable range to provide a deflection of no more than about 0.8 mm at the free end of a spindle. For a tall spindle, with the proximity sensor oriented about 21.29 cm (about 8.38 inches) from the work surface, an acceptable detected deflection would be no more than about 0.51 mm (about 0.020 inches), while for a short spindle, the acceptable detected deflection would be no more than about 0.69 mm (about 0.027 inches). In the illustrated embodiment, the acceptable range is determined by comparing the output to an acceptable maximum limit (when the shaft is deflected away from the sensor). In the alternative, the acceptable range may be determined by comparing the output to an acceptable minimum limit (when the shaft is deflected toward the sensor).

Figure 6:
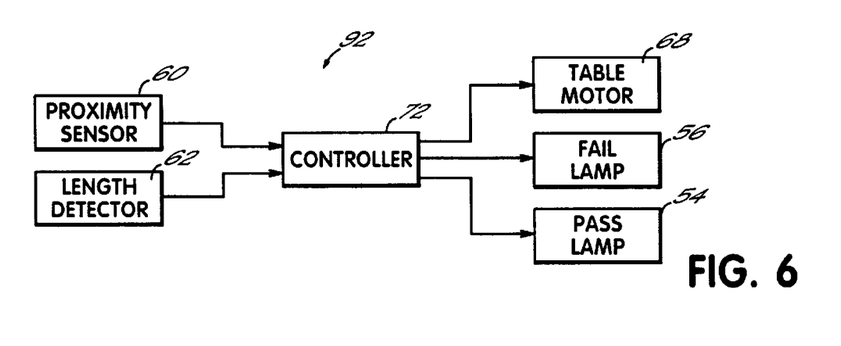
FIG. 6 is a block diagram of the primary electrical components in the test apparatus of FIG. 1.

Now turning to FIG. 6, a representative electrical circuit 92 for test apparatus 10 is illustrated, wherein a controller 72 therein receives inputs from proximity sensor 60 and length detector 62, and outputs control signals to table motor 68, pass lamp 54, and fail lamp 56. In the illustrated embodiment, controller 72 is a Simatic S7-200 (CPU 214) programmable logic controller available from Siemens of Alpharetta, Ga. Other controllers may be utilized in the alternative, as may other electric control circuits.

With the positioning of sensor 60 approximately 7 mm from the expected surface of the shaft of a spindle, the sensor is configured to output a 4–20 milliamp signal to controller 72, which is converted to a 12-bit digital value at a 10 microsecond rate.

Figure 7:
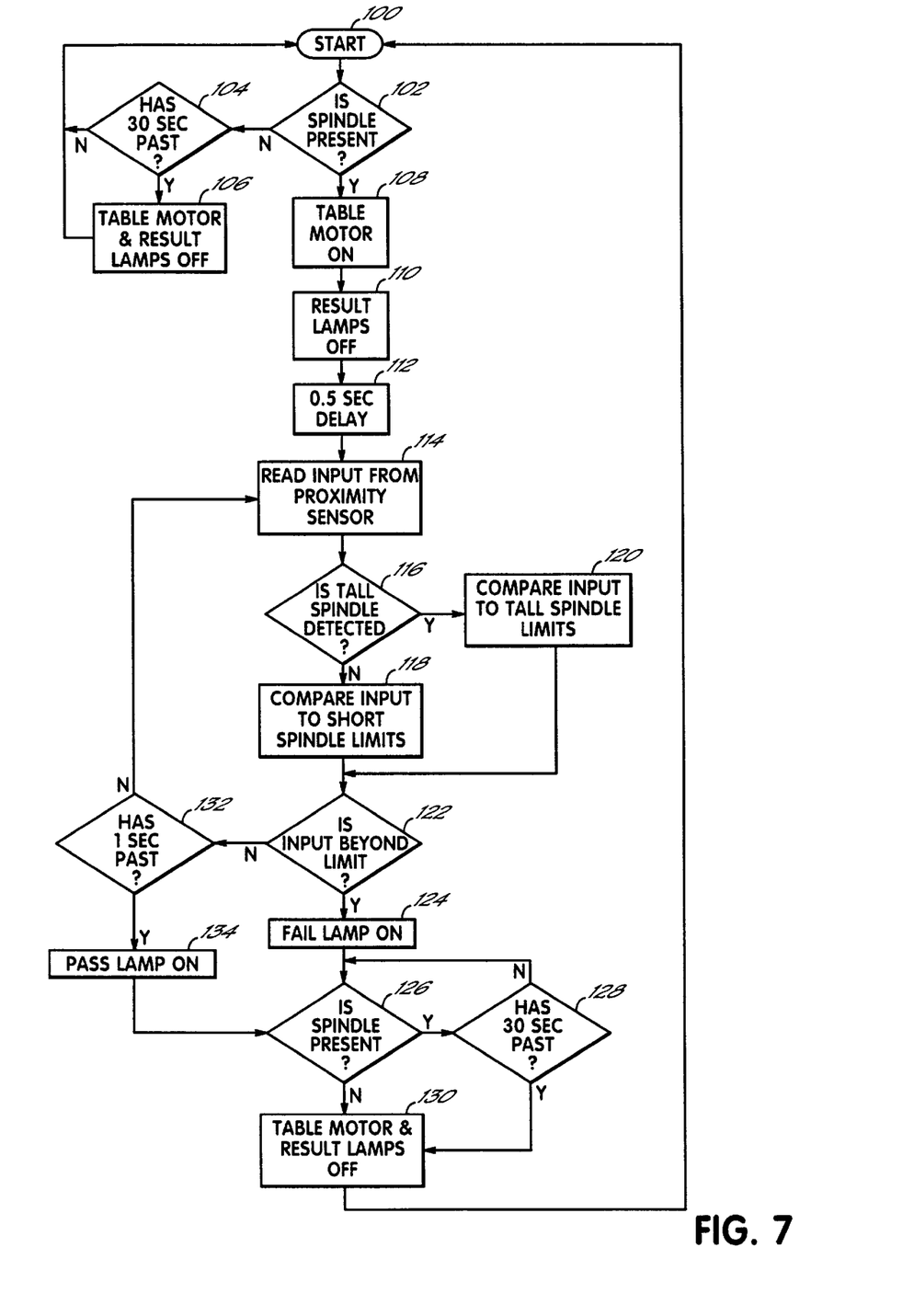
FIG. 7 is a flowchart illustrating the operational steps performed by the controller of FIG. 6 during the testing an optical disc spindle.

FIG. 7 illustrates one suitable program 100 that may be utilized to control test apparatus 10 in a manner consistent with the invention. With program 100, the proximity sensor 60 serves a secondary function of detecting the presence of a spindle on the optical spindle support of the test apparatus, via the distance signal output by the proximity sensor. Thus, routine 100 begins in block 102 by determining whether the spindle is present. In the alternative, a manual test start button or other user input mechanism may be utilized in the alternative, as may an additional sensor that detects the presence of an optical support. However, through the use of the existing proximity sensor, the complexity and automation available in test apparatus 10 is improved.

If no spindle is present, block 102 passes control to block 104. Block 104 is configured to ensure that the table motor and result lamps have been turned off every 30 seconds. Thus, an internal timer is checked in block 104 to determine whether 30 seconds have expired. If so, control passes to block 106 to turn the table motor and result lamps off, prior to returning control to block 102. If the 30-second time period has not passed, block 104 returns directly to block 102. This configuration is provided to maintain the table motor and result lamps on for 30 seconds after a spindle has been removed from the apparatus.

Returning to block 102, once a spindle has been placed on the optical spindle support, control passes to block 108 to turn the table on. Moreover, the result lamps are turned off in block 110, and a one-half second delay is inserted in block 112. Next, the input from the proximity sensor is read in block 114, and based upon whether a tall or short spindle has been detected by the length detector, block 116 passes control to one of blocks 118 and 120 to compare this input value to either of short or tall spindle limits defining the acceptable range for the proximity sensor for each of tall and short spindles. Each of blocks 118, 120 passes control to block 122 to determine whether the input is beyond the acceptable range. If so, the fail lamp is turned on in block 124 and a loop is initiated in block 126 to check every 30 seconds whether a spindle is still present on the optical spindle support. In particular, block 126 determines whether the spindle is present, and if the spindle is still present on the support, control passes to block 128 to determine whether 30 seconds have passed. If not, control returns to block 126. If either a spindle has been removed from the optical support, or if 30 seconds have passed, control passes from either of blocks 126 and 128 to block 130 to turn the table motor and result lamps, returning control to block 102.

Returning to block 122, if the input is not beyond the limit, control passes to block 132 to determine whether 1 second has passed since the beginning of the test cycle. In this embodiment, with a table motor that rotates at a rate of once per second, the output of the proximity sensor is tested for one complete revolution of the optical spindle support. Thus, before expiration of the one-second period, block 132 passes control back to block 114 to again read the input from the proximity sensor. Returning to block 132, if the second has passed, control passes to block 134 to turn on the pass lamp to indicate an acceptable spindle. Control then passes to block 126 to wait for the spindle to be removed from the test apparatus.

It should be appreciated that programming controller 72 to operate in accordance with program 100 is within the ability of one of ordinary skill having benefit of the material herein.

Various modifications may be made to the herein described embodiments without departing from the spirit and scope of the invention. Therefore, the invention lies in the claims hereinafter appended.

What is claimed is:

1. A test apparatus for testing the straightness of an optical disc spindle of the type having first and second ends disposed at opposite ends of a longitudinal axis, the test apparatus comprising:

(a) a rotatable spindle support, configured to rotate about a rotational axis and support the first end of the optical disc spindle with the longitudinal axis thereof extending generally along the rotational axis;

(b) a proximity sensor, disposed at a fixed location relative to the rotational axis of the rotatable spindle support and configured to output a variable proximity signal associated with the distance between the proximity sensor and the optical disc spindle; and (c) an electrical circuit, responsive to the proximity signal and configured to indicate if the distance between the proximity sensor and the optical disc spindle falls outside an acceptable range during rotation of the rotatable spindle support.

2. The test apparatus of claim 1, wherein the proximity sensor is oriented generally perpendicular to and facing the rotational axis to detect the distance to a predetermined position on the optical disc spindle displaced a fixed axial distance from the first end thereof.

3. The test apparatus of claim 1, wherein the proximity sensor comprises a linear analog proximity sensor.

4. The test apparatus of claim 1, further comprising a motor, the motor including a drive shaft coupled to the rotatable spindle support and the electrical circuit and configured to rotate the rotatable spindle support responsive to an actuation signal from the electrical circuit.

5. The test apparatus of claim 4, wherein the motor is an electric motor.

6. The test apparatus of claim 4, wherein the rotatable spindle support comprises a turntable assembly configured to rotate about a generally vertical axis, the turntable assembly including an alignment pin extending outwardly from an upper surface of the turntable assembly along the longitudinal axis and configured to receive a cooperating bore formed in the first end of the optical disc spindle.

7. The test apparatus of claim 6, wherein the turntable assembly includes a turntable shaft extending along the rotational axis from a lower surface of the turntable assembly, the test apparatus further comprising a disc coupling coupled between the drive and turntable shafts.

8. The test apparatus of claim 7, further comprising a base; and a double roll angular bearing rotatably securing the turntable shaft of the turntable assembly to the base.

9. The test apparatus of claim 4, further comprising an optical disc spindle length detector configured to output a length signal associated with the length of the optical disc spindle along the longitudinal axis.

10. The test apparatus of claim 9, wherein the electrical circuit is configured to adjust the acceptable range responsive to the length signal from the optical disc spindle length detector.

11. The test apparatus of claim 10, wherein the optical disc spindle length detector is axially positioned along the rotational axis to output a not detected signal as the length signal when the optical disc spindle has a length less than a predetermined length, and to output a detected signal as the length signal when the optical disc spindle has a length greater than or equal to the predetermined length, and wherein the electrical circuit is configured to determine whether the distance between the proximity sensor and the optical disc spindle is within the acceptable range by comparing the distance with a first predetermined threshold in response to the not detected signal, and comparing the distance with a second predetermined threshold in response to the detected signal.

12. The test apparatus of claim 11, wherein the optical disc spindle length detector comprises an inductive sensor.

13. The test apparatus of claim 4, wherein the electrical circuit comprises:

(a) a fail indicator;

(b) a pass indicator; and (c) a controller, coupled to the motor, the proximity sensor and the fail and pass indicators, the controller configured to actuate the motor to rotate the rotatable spindle support, to actuate the fail indicator if the distance between the proximity sensor and the optical disc spindle falls outside of the acceptable range during actuation of the motor, and to actuate the pass indicator if the distance between the proximity sensor and the optical disc spindle does not fall outside of the acceptable range after actuation of the motor for a predetermined test cycle time.

14. The test apparatus of claim 4, wherein the electrical circuit is configured to actuate the motor responsive to detection of the optical disc spindle by the proximity sensor.

15. A test apparatus for testing the straightness of an optical disc spindle of the type having first and second ends disposed at opposite ends of a longitudinal axis, the test apparatus comprising:

(a) a base including a work surface;

(b) a rotatable spindle support, rotatably mounted to the work surface of the base, the spindle support configured to rotate about a rotational axis and support the first end of an optical disc spindle with the longitudinal axis thereof extending generally along the rotational axis and with the second end thereof disposed a predetermined distance from the work surface;

(c) a length detector, coupled to the base and disposed at a first distance from the work surface in the direction of the rotational axis, the length detector configured to detect the presence of an optical disc spindle supported by the rotatable spindle support when the second end of the optical disc spindle is at least the first distance from the work surface;

(d) a proximity sensor, coupled to the base and disposed at a second distance from the work surface in the direction of the rotational axis, the second distance less than the first distance, and the proximity sensor configured to detect the distance between the proximity sensor and the optical disc spindle;

(e) a controller, coupled to the length detector and the proximity sensor, the controller configured to indicate, during rotation of the rotatable spindle support, if the distance between the proximity sensor and the optical disc spindle falls outside of a first acceptable range when the length detector detects the presence of the optical disc spindle, and if the distance between the proximity sensor and the optical disc spindle falls outside of a second acceptable range when the length detector does not detect the presence of the optical disc spindle.

16. The test apparatus of claim 15, further comprising a motor coupled to the rotatable spindle support and configured to rotate the rotatable spindle support responsive to the controller, wherein the controller is configured to actuate the motor in response to detection of the presence of the optical disc spindle supported by the rotatable spindle support by the proximity sensor.

17. A method of testing the straightness of an optical disc spindle of the type having first and second ends disposed at opposite ends of a longitudinal axis, the method comprising:

(a) rotating an optical disc spindle about a rotational axis when the optical disc spindle is oriented with the longitudinal axis thereof generally oriented along the rotational axis;

(b) during rotation of the optical disc spindle, indicating if the distance between the optical disc spindle and a fixed position relative to the rotational axis falls outside of an acceptable range.

18. The method of claim 17, wherein indicating if the distance between the optical disc spindle and the fixed position includes:

(a) detecting the distance with a proximity sensor and outputting a proximity signal in response thereto; and (b) indicating that the distance falls outside of the acceptable range by comparing the proximity signal to a predetermined threshold.

19. The method of claim 17, wherein rotating the optical disc spindle includes actuating a motor coupled to a rotatable spindle support upon which is supported the optical disc spindle.

20. The method of claim 19, further comprising detecting the presence of the optical disc spindle on the rotatable spindle support, wherein rotating the optical disc spindle and indicating if the distance falls outside of the acceptable range is performed automatically in response to detection of the presence of the optical disc spindle of the rotatable spindle support.

21. The method of claim 17, further comprising:

(a) detecting the length of the optical disc spindle along the longitudinal axis; and (b) adjusting the acceptable range responsive thereto.

22. The method of claim 21, wherein the optical disc spindle has one of first and second lengths, with the first length shorter than the second length, wherein detecting the length of the optical disc spindle includes attempting to detect a portion of the optical disc spindle using a length detector positioned to detect the portion of the optical disc spindle only when the optical disc spindle has a length that is greater than the first length, and wherein adjusting the acceptable range comprises selecting a first acceptable range if the portion of the optical disc spindle is not detected by the length detector, and selecting a second acceptable range if the portion of the optical disc spindle is detected by the length detector.

23. The method of claim 17, wherein indicating if the distance falls outside of the acceptable range includes activating a fail indicator, the method further comprising activating a pass indicator if the distance does not fall outside of the acceptable range after being rotated for a predetermined test cycle time.

* * * * *

UNITED STATES PATENT AND TRADEMARK OFFICE
CERTIFICATE OF CORRECTION

PATENT NO. : 6,085,429
DATED : July 11, 2000
INVENTOR(S) : Cresgy, et al.

It is certified that error appears in the above-identified patent and that said Letters Patent is hereby corrected as shown below:

Column 4, line 36 reads "h," and should read -- $h_1$ --.

Column 4, line 36 reads "x," and should read -- $x_r$ --.

Column 5, line 11 reads "$Y_2$" and should read -- $y_2$ --.

Column 5, line 12 reads "$Y_2$" and should read -- $y_2$ --.

Signed and Sealed this

Eighth Day of May, 2001

*Attest:*

NICHOLAS P. GODICI

*Attesting Officer*    *Acting Director of the United States Patent and Trademark Office*